Sept. 7, 1954  J. M. PARKER  2,688,504
CARGO TIE-DOWN ASSEMBLY
Filed March 5, 1952  2 Sheets-Sheet 1

INVENTOR:
JOHN M. PARKER
BY
his ATTORNEYS

Sept. 7, 1954  J. M. PARKER  2,688,504
CARGO TIE-DOWN ASSEMBLY
Filed March 5, 1952  2 Sheets-Sheet 2
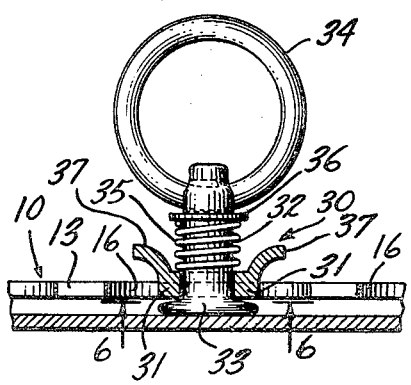
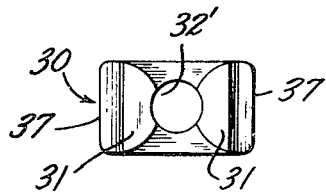
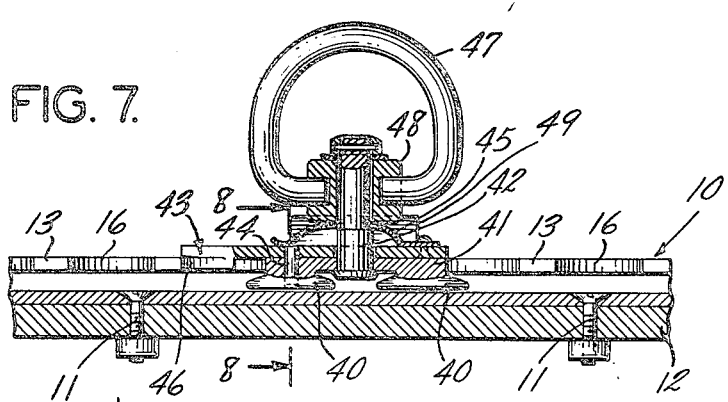
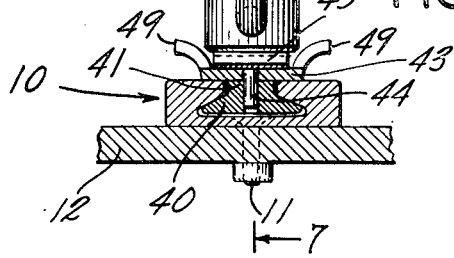
INVENTOR:
JOHN M. PARKER
BY
his ATTORNEYS Patented Sept. 7, 1954

2,688,504

UNITED STATES PATENT OFFICE 2,688,504

CARGO TIE-DOWN ASSEMBLY

John M. Parker, San Mateo, Calif., assignor to Pan American World Airways, Inc., New York, N. Y., a corporation of New York Application March 5, 1952, Serial No. 274,921

12 Claims. (Cl. 287—20.5)

1

This invention relates to a cargo tie-down assembly, and has particular reference to means for use in securing cargo in the hold of aircraft, ships, trucks, railway cars and the like, although its use is not limited thereto.

Numerous expedients have been proposed for rendering cargo securing means more adaptable for use with miscellaneous types of cargo than are the usual fixed rings located at spaced intervals on the floor, walls, or ceiling of a cargo hold. Although several transferable forms of rings or loops have been devised heretofore, they usually involve several manipulations to transfer them from one point to another, are complicated and frequently insecure, whereas a simple and secure type is desirable.

In accordance with the present invention, a cargo tie-down assembly is provided which is readily removed and emplaced with one hand and once emplaced, cannot be unintentionally dislodged.

The invention comprises the combination of a fixed rail or the like on the floor, wall or ceiling of a cargo space and forming an inverted T-shaped slot communicating at spaced intervals with enlarged recesses or sockets adapted to receive the head of a pin carrying at its free or outer end the ring or loop for receiving the cargo lashing cords or straps. Pivotally mounted on the pin and urged toward the head thereof by a spring, is a retainer cleat adapted to overlie the rail slot and having an enlarged detent located at each side of the pin and spaced apart the distance between adjacent sockets in the rail so as to be simultaneously forced by the spring into such sockets when aligned therewith to lock the head in the T-shaped channel against movement therealong.

It will be seen that the cargo tie-down assembly of this invention may be simply emplaced at any desired point along the rail by pressing the head into one of the rail sockets therein and sliding the unit along the rail until the spring-pressed detents snap into adjacent rail sockets to lock the head behind the overhanging flanges forming the inverted T slot. Except that the ring, pin and head may swivel, the unit is immovable and cannot be accidentally dislodged. In order to remove the unit, the retainer is lifted against the spring to release its detents from the rail sockets, the pin moved along the rail to align its head with an adjacent socket, whereupon the unit may be withdrawn and transferred to another point.

For a more complete understanding of the invention, reference may be had to the accompanying drawings, wherein:

Fig. 5 is a longitudinal section similar to Fig. 1, showing a modified form of the cargo tie-down assembly of this invention;

Fig. 6 is a bottom view of the locking retainer of Fig. 5 as seen along the line 6—6 thereof;

Fig. 7 is a longitudinal section through another modification as seen along the line 7—7 of Fig. 8; and Fig. 8 is a transverse section therethrough as seen along the line 8—8 of Fig. 7.

Figure 1:
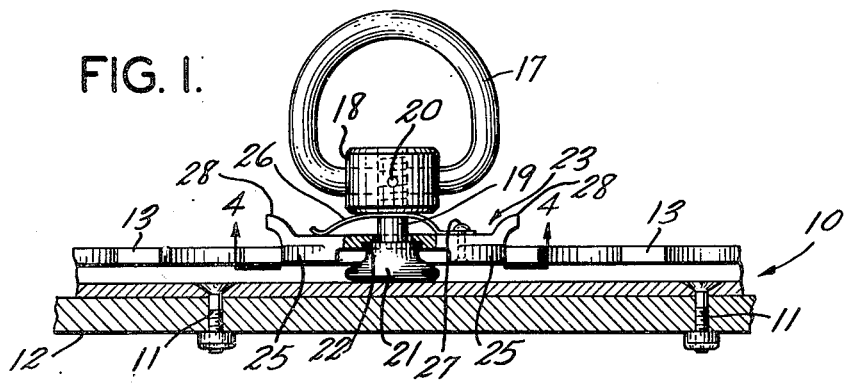
Figure 1 is a side elevation of the cargo tie-down assembly of this invention as seen with the rail in section along the line 1—1 of Fig. 2.
Figure 2:
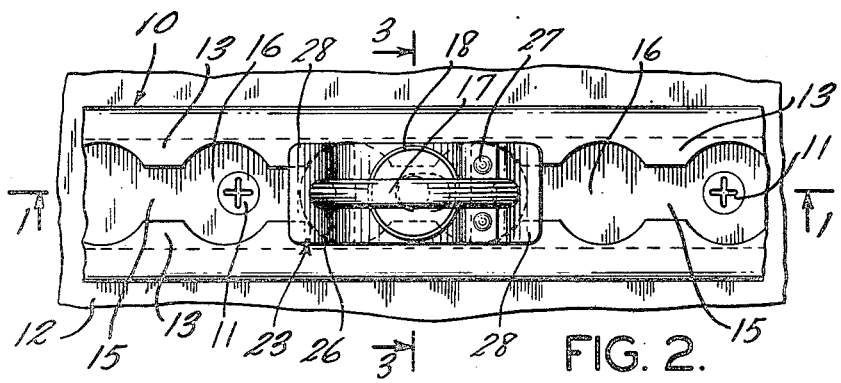
Fig. 2 is a plan view thereof.
Figure 3:
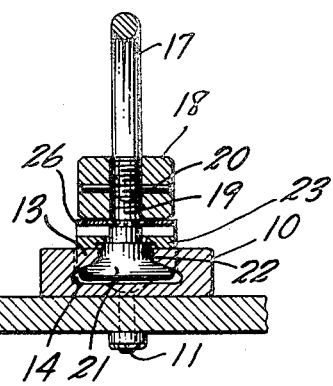
Fig. 3 is a transverse cross-section therethrough as seen along the line 3—3 of Fig. 2.

Referring to Figs. 1, 2 and 3 of the drawings, numeral 10 designates a rail which is adapted to be secured by bolts 11, shown in Fig. 1, to the wall, floor or ceiling 12 of the cargo hold or other storage space. One or more of such rails 10 may be secured to each inner surface of the hold, preferably in the direction of normal movement of the cargo in loading and unloading so as to serve as friction-reducing guides for the cargo. Obviously, the rails 10 may be recessed flush with the surface of the wall, floor or ceiling 12, if desired.

Rail 10 is channel-shaped as shown in Fig. 3, and the longitudinal upper edges thereof are provided with inwardly-turned lateral flanges 13 which overhang the channel 14 and which define the narrow, longitudinal slot 15, thus forming the inverted T-shaped slot shown in Fig. 3.

The opposite inner edges of the flanges 15 are serrated or notched at regularly-spaced intervals to form the recesses or sockets 16, which are preferably circular as shown in Fig. 2 and have a diameter equal to or slightly less than the width of the channel 14. The spacing between the sockets 16 may be on the order of 1½ inches, more or less, depending upon the spacing required between cargo tie-down rings.

The ring 17 for receiving the hook, strap, cord or other means for lashing or tying the cargo in place may be in the form of a bail pivoted in a swivel threaded on a pin 19 and secured in place thereon by a pin 20 driven through swivel 18 and pin 19.

Preferably formed integrally with pin 19 is a circular head 21 having a diameter slightly less than the diameter of the sockets 16 for ready insertion therein, and a contour conforming generally to that of the inverted T-shaped slot in rail 10 between the sockets 16, as is shown in Fig. 3. A circular shoulder 22 at the junction between the pin 19 and head 21 is slightly smaller in diameter than the width of the rail slot 15, i. e., than the spacing between the flanges 13 so as to pass therebetween, as shown by Fig. 3.

Figure 4:
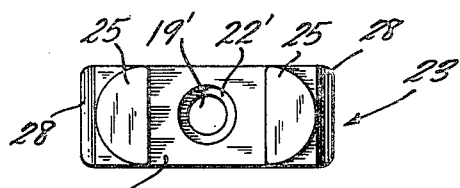
Fig. 4 is a bottom view of the locking retainer, as seen along the line 4—4 of Fig. 1.

Loosely mounted on pin 19 between the swivel 18 and the shoulder 22 of the head 21 is retainer 23 which comprises a flat plate 24 having a center hole 19' counterbored from below at 22' to accommodate the pin 19 and the shoulder 22, respectively, as is best shown in the underside view of the retainer 23 depicted by Fig. 4.

Integrally formed on the underside of plate 24 at opposite sides of the center hole 19' are detents 25 which are generally semicircular with their centers of curvature spaced apart the distance between adjacent rail sockets 16. The detents 25 are slightly smaller in diameter than the rail sockets 16 so as to readily lodge therein, and the detents are so spaced and curved as to engage the far edges of the corresponding sockets 16 as is best shown in Figs. 1 and 2. The thickness of the detent 25 is approximately the thickness of the rail flange 13 and the depth of the counterbore 22' is such as to accommodate the shoulder 22 when the head 21 just clears the floor of the channel 14, as shown in Figs. 1 and 3.

Interposed between the upper surface of retainer 23 and the under surface of swivel 18 is a bowed leaf spring 26. Spring 26 preferably is formed of spring steel, secured as by rivets 27 at one end to the upper surface of retainer 23, and bears on the retainer with its free end and has an enlarged center hole for the passage of the pin 19. As is evident, the function of the spring 26 is to urge retainer 23 toward the head 21, to the limit afforded by the engagement of shoulder 22 with the bottom of the counterbore 22'. Retraction of the retainer away from the head 21 and its shoulder 22 is facilitated by finger hooks or ears 28 formed on the opposite ends of the top plate 24 of retainer 23.

In operation of the cargo tie-down ring assembly of this invention, as shown in Figs. 1 to 4, inclusive, the cargo hold or other space is fitted with the rails 10 for the reception of the tie-down unit 17—28, or alternatively for seats or the like, also adapted for use with rails 10, depending on requirements. Assuming that the rails 10 are to be used for cargo securing purposes, the user selects the point at which the ring 17 is required in the rail 10, inserts the head 21 in the nearest socket 16, pushes down on the ring 17 so that spring 26 is compressed because the retainer 23 rests on top of flanges 13 on either side of the selected socket 16, and then slides the unit along the rail 10 in either direction to position the head 21 beneath flanges 13, whereupon detents 25 snap into the adjacent sockets 16 under pressure of spring 26. The unit is accordingly locked in place with its head 21 lodged under flanges 13 and detents 25 seated in the sockets at either side thereof, as shown in Figs. 1, 2 and 3.

Alternatively, the user may retract retainer 23 away from head 21 and shoulder 22 by placing his thumb on swivel 18, and his two fingers under the retainer hooks or ears 28 and pressing down with his thumb. He then inserts head 21 in the selected socket 16, moves the unit along the rail to position head 21 under the flanges 13 and align detents 25 with adjacent holes 16 and then releases the retainer to allow spring 26 to seat detents 25 in the corresponding sockets 16.

However emplaced, the assembly is secure against unintended dislodgment, and since the spring 26 presses retainer 23 down against the upper surfaces of the rail flanges 13 and pulls the head flange 22 up against the bottom of counterbore 22', the unit cannot rattle whether loaded or unloaded. Also, because the head 21, pin 19 and shoulder 22 are circular, they can rotate relatively to the rail 10 and retainer 23, whereby ring 17 swivels to accommodate various angles of strap, cord or hook used therewith to lash the cargo unit in place.

Removal of the unit is simply accomplished by pulling outwardly on the retainer 23 to unseat detents 25 from sockets 16 and moving the unit along the rail to the adjacent socket 16 for releasing the head 21 therefrom.

Figs. 5 and 6 illustrate a modification unit which is somewhat more compact than the unit shown in Figs. 1 to 4, principally in that the retainer 30 is shorter because the detents 31 engage the near edges of the corresponding sockets 16 as is best shown by the underside view of the retainer 30 shown in Fig. 6. There the detents 31 are relatively close together and are curved outwardly in conformance with the curvature of the near edges of adjacent sockets 16, whereas in Fig. 4, the detents 25 are relatively far apart and curve inwardly in conformance with the curvature of the far edges of adjacent sockets 16.

The pin 32 is larger in diameter than is pin 19 in Figs. 1 and 3, being the diameter of the shoulder 22 thereof, i. e., slightly smaller than the rail slot 15. Accordingly, the hole 32' in Fig. 6 corresponds in diameter to the diameter of counterbore 22' in Fig. 4, whereas the shape and dimensions of the head 33 remain the same as those of head 21. The ring 34 passes through a hole in the upper end of pin 32 and a coil spring 35 encircles the pin 32 between the upper surface of retainer 30 and the washer 36 which bears against ring 34. Because washer 36 is thus urged against ring 34, spring 35 performs the additional function of frictionally holding the ring 34 at any angle at which it is positioned when otherwise free, thereby facilitating insertion of the tie-down straps, cords or hooks in or through ring 34.

It will be understood that the unit of Figs. 5 and 6 is emplaced in and removed from the rail 10 in the same way as described in connection with Figs. 1 to 4, finger hooks or ears 37 being provided on retainer 30 to facilitate manipulation thereof.

For purposes of tying down very heavy loads, which might apply forces exceeding the strength of one pair of opposite rail flanges 13, particularly when the sockets 16 are closely spaced as shown in Fig. 2, the load may be distributed between two or more pairs of opposite flanges 13 in the manner provided by the modification of Figs. 7 and 8.

Referring to Figs. 7 and 8, two heads 40 of the diameter and shape to fit into sockets 16 in rail 10 are spaced apart the distance between sockets 16 on a bar 41 having a width slightly less than the width of rail slot 15 so as to fit therein, and having a thickness the same or slightly less than the thickness of rail flanges 13 at slot 15.

Retainer 43 is a flat plate overlying the upper surface of rail 10 and having a hole for the pin 42. When the unit is detached from rail 10 the retainer 43 overlies the bar 41 under pressure of leaf spring 45 and is centered thereon jointly by pin 42 and a centering pin 44 carried by retainer 43 and sliding in a hole in bar 41, as shown in Fig. 8. The retainer 43 may have two locking detents as in Figs. 1 to 6, but one will serve the purpose of holding the unit so that heads 40 lie under adjacent pairs of rail flanges 13. Thus, retainer 43 as shown in Fig. 7 has one detent 46 for lodgment in the corresponding socket 16 to lock the unit of Figs. 7 and 8 in place.

In order to afford swivelling action for the ring 47 in Fig. 7, since the whole unit cannot turn as in the case of those shown in Figs. 1 to 6, swivel 48 carrying the ring 47 is rotatably mounted on pin 42 in the manner shown in Fig. 7, so that ring 47 and swivel 48 may turn on pin 42 which is riveted to bar 41.

To emplace the unit shown in Figs. 7 and 8, the user grasps the finger ears or hooks 49 extending to each side of retainer 43 to retract the same against spring 45, inserts heads 40 in the corresponding rail sockets 16, slides the unit along the rail 10 to lodge heads 40 under adjacent pairs of flanges 16 and align detent 46 with the corresponding socket 16, and then releases retainer 43 to allow spring 45 to seat the detent 46 in socket 16 to lock the unit in place against movement along rail 10. The load applied to ring 47 is transferred to two pairs of opposite flanges 13 by the corresponding heads 40 lodged under them, and thus the unit of Figs. 7 and 8 will stand approximately twice the load of the units shown in Figs. 1 to 6. In the same way, the unit of Figs. 7 and 8 may be made longer to span three or more opposite sets of rail flanges 13.

The assembly of this invention may also be used to mount and secure seats to parallel rails 10, simply by seating the pins 19, 32 or 42 of Figs. 1, 5 and 7, respectively, in corresponding holes provided therefor in the ends of the chair legs, in a manner similar to chair casters. Thus, the end of the seat leg corresponds to and functions as the lower surface of swivel 18 or 48 in Figs. 1 and 7 or the lower surface of the washer 36 in Fig. 5, against each of which the corresponding springs 27, 45 and 35 abut, the said swivels and washer and their corresponding rings 17, 47 and 34 being omitted.

Although several preferred embodiments of the invention have been illustrated and described herein, it is to be understood that changes in form and detail may be made without departing from the spirit of the invention. Thus, the coil spring of Fig. 5 may be substituted for the leaf spring of Figs. 1 and 7, a single detent like that of Fig. 7 may be employed with the retainers of Figs. 1 and 5 instead of two, and various other changes may be made within the scope of the appended claims.

I claim:

1. In combination with a relatively fixed means having a relatively wide elongated channel, a lateral flange overlying the channel and forming a relatively narrow surface slot communicating with said channel, said flange having serrated edges forming spaced apart enlargements in said slot, the combination of a pin detachably engageable in the said slot and movable therealong, means on said pin for securing a load thereto, an enlarged head on said pin insertable into and removable through the slot enlargements, said head being movable along the channel out of alignment with said enlargements to engage behind said flange and retain said pin in said fixed means, a retainer mounted on said pin, and detent means on said retainer releasably engaging at least one slot enlargement to lock said head in said channel out of alignment with said enlargements and secure said pin to said fixed means.

2. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of a pin detachably engageable in and movable along said slot, means on said pin for securing a load thereto, an enlarged head on said pin insertable in one of said sockets and removable therefrom and movable along the channel out of alignment with said sockets to lodge behind at least one of said flanges and secure said pin to said fixed means, a retainer on said pin, and a detent on said retainer releasably engageable in at least one adjacent socket to lock said head in said channel out of alignment with said sockets and behind said flange.

3. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of a pin adapted to be inserted through said slot, an enlarged head on said pin having a dimension adapted to lodge in the channel behind at least one of said flanges, a shoulder between said pin and said head having a dimension adapted to pass through said slot, a retainer movable axially on said pin, and a detent on said retainer adapted to seat in an adjacent socket for locking said head in said channel behind said flanges.

4. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of a member engageable in said slot, means on said member for securing a load thereto, at least one enlarged head on said member and having a diameter slightly less than the diameter of said sockets and larger than the width of said slot, said member being movable along said slot to position said head out of alignment with said sockets and lodge it in the channel behind at least one of said flanges, a retainer movable axially on said pin, and a detent on said retainer adapted to seat in at least one adjacent socket for locking said head in said channel behind said flanges.

5. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of an elongated member engageable in said slot, means on said member to secure a load thereto, a plurality of heads on said member and having a dimension slightly less than the dimension of said sockets and spaced apart the distance between at least two sockets, said member being movable along said slot to position said head out of alignment with said sockets and behind said flanges, a retainer movable axially on said pin, and at least one detent on said retainer adapted to seat in an adjacent socket for locking said heads behind said flanges.

6. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of a pin detachably engageable in said slot, means on said pin for securing a load thereto, an enlarged head on said pin engageable in one of said sockets and movable along the channel out of alignment with said sockets into a position behind at least one of said flanges, a retainer movable axially on said pin, a detent on said retainer adapted to seat in an adjacent socket to lock said head in said channel behind said flange, and resilient means normally urging said retainer toward said head to hold the detent in the corresponding socket.

7. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of a pin adapted to be inserted through said slot, an enlarged head on said pin having a dimension adapted to lodge in the channel behind at least one of said flanges, a shoulder between said pin and said head having a dimension adapted to pass through said slot, a retainer movable axially on said pin, a detent on said retainer adapted to seat in an adjacent socket for locking said head in said channel behind said flanges, and resilient means normally urging said retainer toward said head to hold the detent in the corresponding socket.

8. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of a member detachably engageable in said slot, means on said member to secure a load thereto, at least one enlarged head on said member and having a diameter slightly less than the diameter of said sockets and greater than the width of said slot to engage in the channel behind at least one of said flanges, a retainer movable axially on said pin, a detent on said retainer engageable in a socket for locking said head in said channel out of alignment with said sockets and behind said flanges, and resilient means normally urging said retainer toward said head to hold the detent in the corresponding socket.

9. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of an elongated member adapted to be inserted through said slot, a plurality of heads on said member and having a dimension slightly less than the dimension of said sockets and spaced apart the distance between at least two sockets and adapted to lodge in the channel behind said flanges, a retainer movable axially on said pin, at least one detent on said retainer adapted to seat in an adjacent socket for locking said heads in said channel behind said flanges, and resilient means normally urging said retainer toward said head to hold the detent in the corresponding socket.

10. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of a member adapted to be inserted through said slot, at least one enlarged head on said member and having a diameter slightly less than the diameter of said sockets and adapted to lodge in the channel behind at least one of said flanges, a retainer movable axially on said pin, and a pair of spaced detents on said retainer adapted to seat in adjacent corresponding sockets for locking said head in said channel behind said flanges.

11. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of an elongated member adapted to be inserted through said slot, a plurality of heads on said member and having a dimension slightly less than the dimension of said sockets and spaced apart the distance between at least two sockets and adapted to lodge in the channel behind said flanges, a retainer movable axially on said pin, at least one detent on said retainer adapted to seat in an adjacent socket for locking said heads in said channel behind said flanges, and centering means interposed between said member and said retainer for centering them relatively to each other.

12. In combination with relatively fixed means having a plurality of spaced sockets connected by a relatively wide elongated channel behind a relatively narrow surface slot defined by spaced lateral flanges and forming an inverted T-shaped passage between adjacent sockets, the combination of a pin adapted to be inserted through said slot, an enlarged head on said pin having a dimension adapted to lodge in the channel behind at least one of said flanges, a shoulder between said pin and said head having a dimension adapted to pass through said slot, a retainer movable axially on said pin, a pair of spaced detents on said retainer adapted to seat in adjacent sockets for locking said head in said channel behind said flanges, and a spring normally urging said retainer toward said shoulder.

References Cited in the file of this patent

UNITED STATES PATENTS

| Number | Name | Date |
|---|---|---|
| 1,951,969 | Di Carlo | Mar. 20, 1934 |
| 2,088,320 | De Vries | July 27, 1937 |
| 2,312,985 | Bales | Mar. 2, 1943 |

FOREIGN PATENTS

| Number | Country | Date |
|---|---|---|
| 164,448 | Germany | of 1905 |